March 4, 1958 G. L. KNIGHT 2,825,581
SAFETY SHOULDER AND LAP BELT DEVICE FOR
MOTOR VEHICLE PASSENGERS
Filed June 29, 1956 4 Sheets-Sheet 3
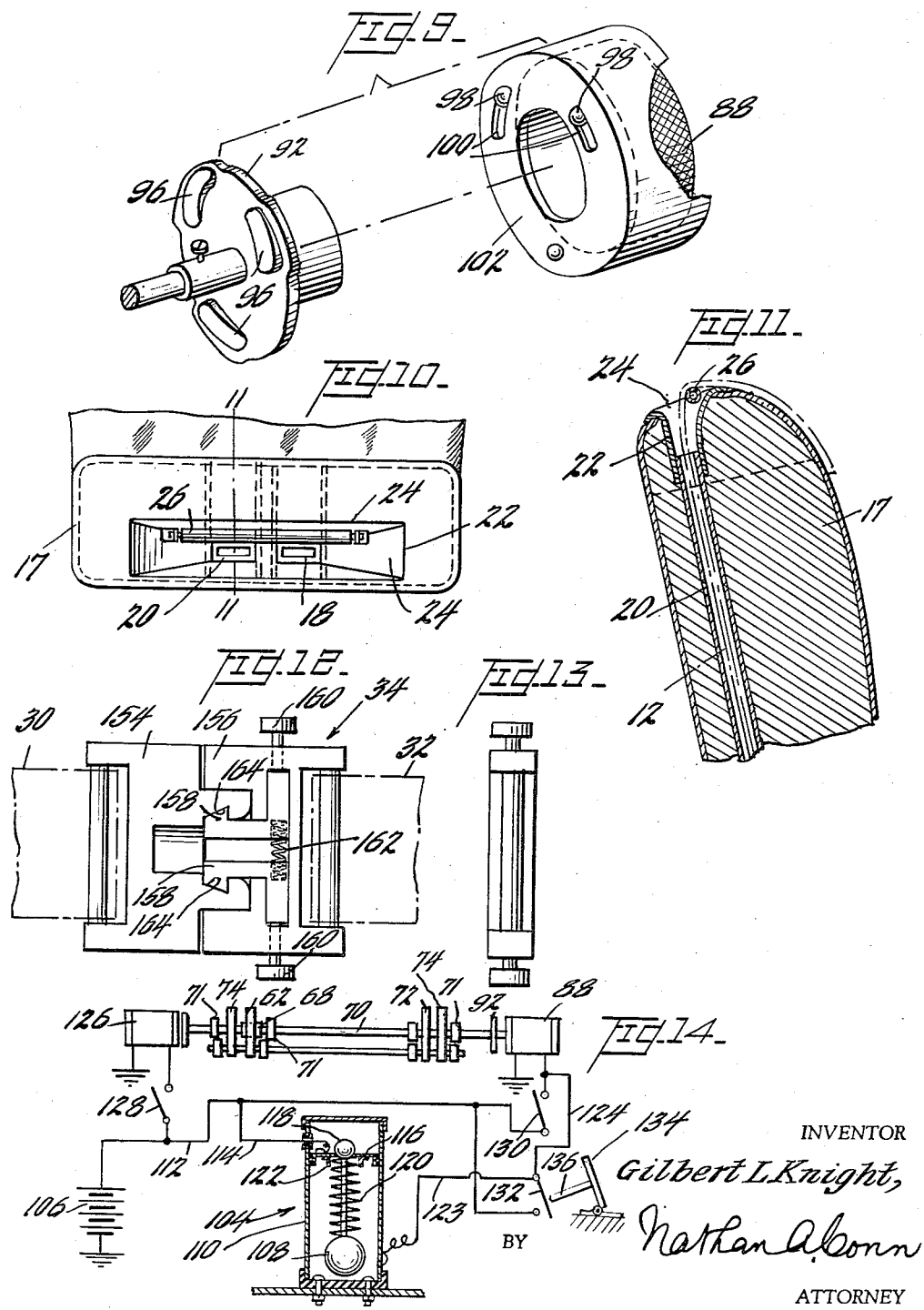
INVENTOR
*Gilbert L. Knight,*
BY *Nathan A. Conn*
ATTORNEY

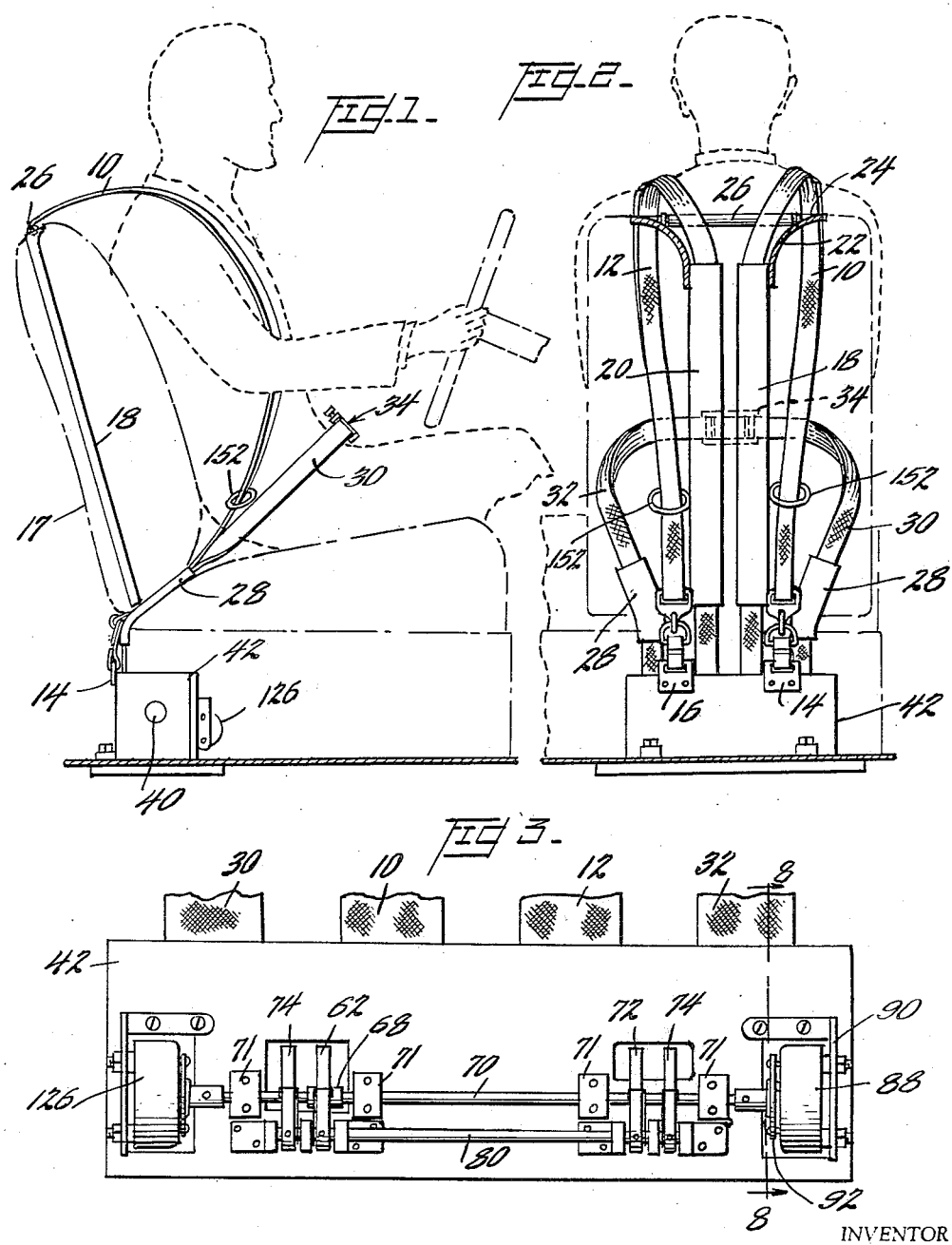

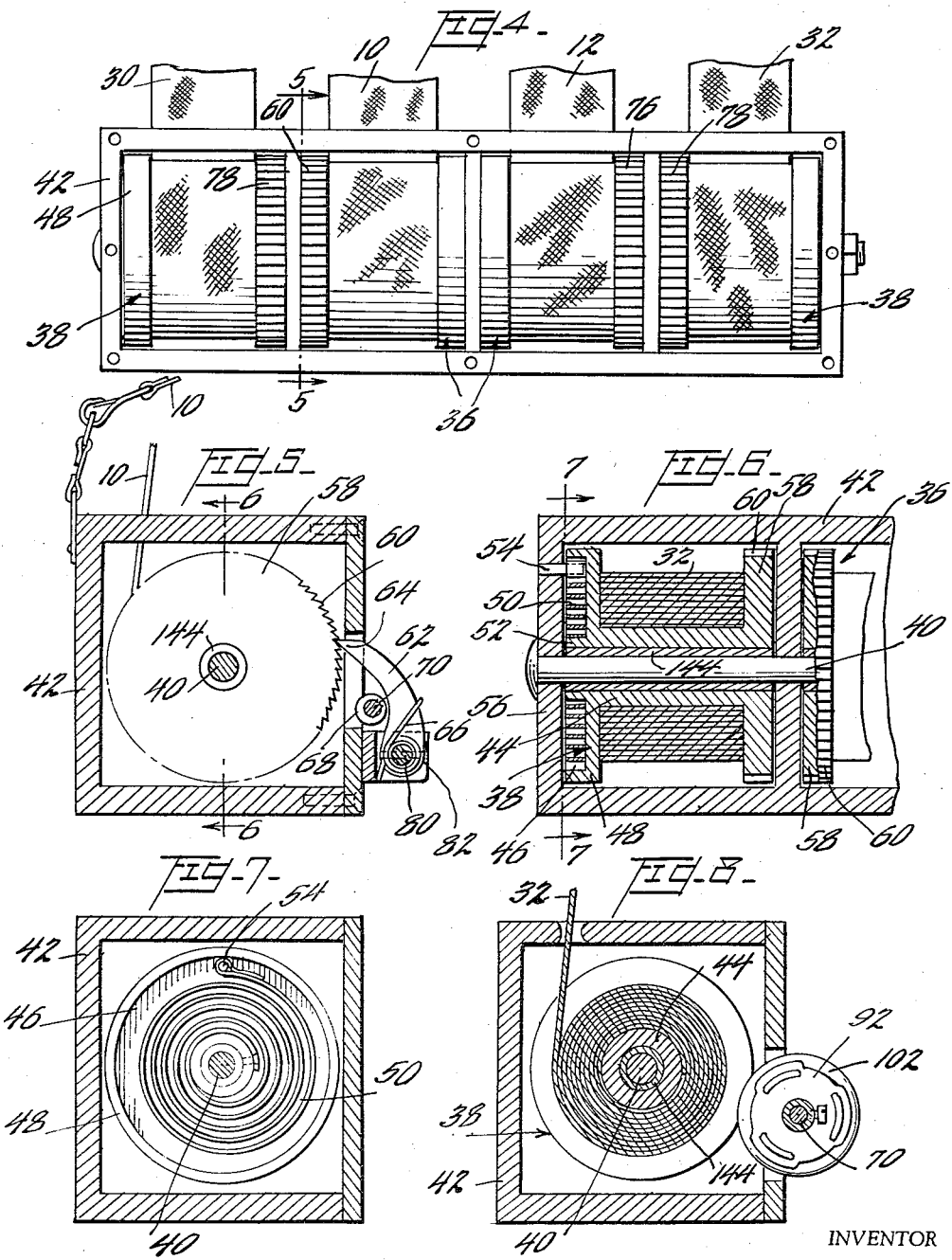

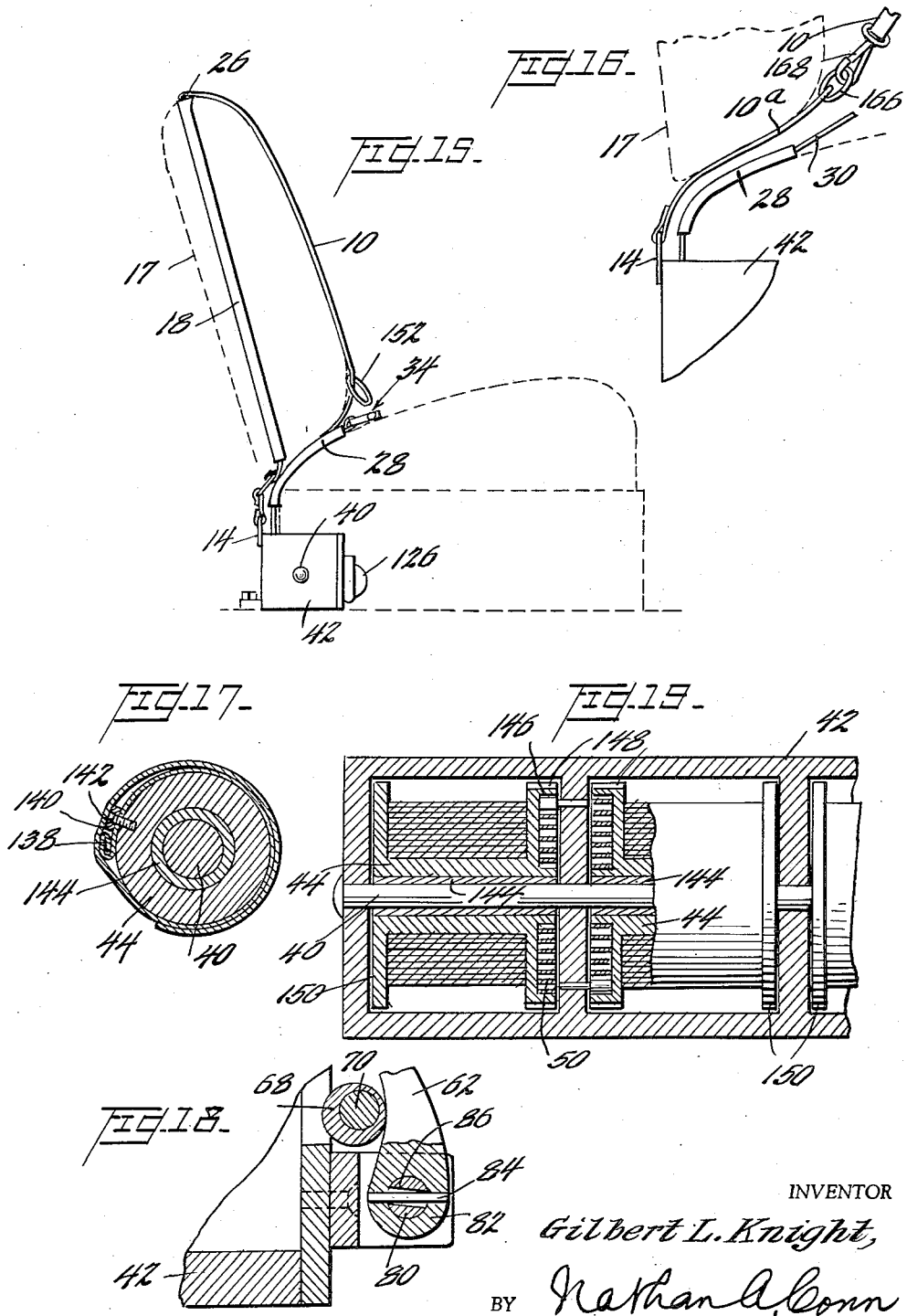

United States Patent Office 2,825,581
Patented Mar. 4, 1958

2,825,581

SAFETY SHOULDER AND LAP BELT DEVICE FOR MOTOR VEHICLE PASSENGERS

Gilbert L. Knight, Needville, Tex.

Application June 29, 1956, Serial No. 594,991

15 Claims. (Cl. 280—150)

This invention relates to safety devices for preventing injury to passengers riding on vehicles in the event of sudden deceleration in case of accident or other reason.

One object of the invention is to provide a safety harness for the passenger which normally permits his free movement but, in the event of sudden deceleration of the vehicle, is automatically locked to hold the passenger to his seat and prevent his being thrown.

Another object is to provide a safety harness of this character with separate automatic take-up means for each shoulder of the passenger so as to afford him greater freedom of movement during normal riding.

Another object is to provide a separate lap belt in addition to the shoulder harness and separate take-up means for the portions of this belt.

Another object is to provide electrically operated means for locking the take-up means in case of sudden deceleration of the vehicle, so as to prevent the paying out of the harness but permitting the retraction thereof, the electric circuit being normally open, and closed by the sudden deceleration of the vehicle.

Another object is to provide electrically operated means of the character above indicated which is operative by the instantaneous closing of the circuit to lock the take-up means and maintain it locked until the locking means is disengaged by a manually controlled operation.

Another object is to provide a plurality of separate spring reels, one for each element of the harness and a common operating means for locking all of the reels in the event of a sudden deceleration of the vehicle.

Another object is to provide guide means for the strap sections of the harness, whereby the sections may be free to be withdrawn by the spring reels out of the way when the harness is not in use.

Another object is to provide electric circuit closing means operated by the sudden application of the brake for energizing the reel locking means so as to prevent paying out of the harness in the event of the sudden deceleration of the vehicle due to the abrupt operation of the brake.

Another object is to provide a normally open inertia switch operative to close the circuit for energizing the lock operating means for the harness, in the event of the sudden deceleration of the vehicle in any direction.

Further objects and advantages will appear from the following detailed description and the features of novelty will be particularly pointed out in the claims.

In the accompanying drawings, illustrating preferred embodiments of the invention, Fig. 1 is a side elevational fragmental view of my improved safety harness shown as worn by a passenger on a vehicle seat;

Fig. 2 is a rear elevational view partly in section of the harness as worn by a passenger seated as in Fig. 1;

Fig. 3 is an elevational detail view of the reel carrying unit, illustrating the pawl operating means for the reel;

Fig. 4 is an elevational detail view of the unit illustrated in Fig. 3 with the cover plate bearing the pawl and pawl operating means removed;

Fig. 5 is a sectional elevation, the section being taken along lines 5—5 of Fig. 4;

Fig. 6 is a fragmental sectional elevation, the section being taken along line 6—6 of Fig. 5;

Fig. 7 is a sectional elevation, illustrating the spring reel, the section being taken along lines 7—7 of Fig. 6;

Fig. 8 is a sectional elevation, the section being taken along lines 8—8 of Fig. 3;

Fig. 9 is an exploded view in perspective illustrating the solenoid and armature for operating the cam actuating means for the pawl;

Fig. 10 is a detail plan view of a portion of the top of the back of the seat illustrating the guiding means for the harness;

Fig. 11 is a fragmental sectional side elevation of a portion of the back of the vehicle seat, the section being taken along lines 11—11 of Fig. 10;

Fig. 12 is a detail elevational view illustrating the preferred form of buckle for connecting the sections of the lap belt;

Fig. 13 is an end view of the buckle illustrated in Fig. 12;

Fig. 14 is an electric circuit diagram illustrating the connections for the solenoids for operating the automatic locking means, the inertia switch being shown in sectional elevation;

Fig. 15 is a side elevational view of the harness, illustrated as retracted out of the way against the back of the vehicle seat;

Fig. 16 is a fragmental detail view illustrating a modified form of connection for the shoulder straps whereby they may be connected so as to be worn in parallel or in crossed relation;

Fig. 17 is an enlarged cross sectional detail view illustrating a preferred connection of the straps to the hub of the reels;

Fig. 18 is a cross sectional elevational detail view illustrating the lost-motion connection between the pawl and the master shaft;

Fig. 19 is a fragmental horizontal sectional elevational view of a modified form of reel.

Safety devices formerly provided for preventing passengers being thrown from their seats in the event of sudden deceleration of the vehicle have been found largely ineffective, for the reason that although having the device on his car the passenger would not use it because of his feeling unduly restrained during normal riding. Those safety belts or harnesses operated by inertia devices as heretofore found in the prior art also had the objection of not giving the rider complete freedom and, when not in use, would be in the way of the passenger. Devices of this kind in the prior art having electrical operation also had the objection that they required constant use of current and would therefore be a drain on the battery.

My invention overcomes all of these difficulties as will appear in the following detailed description.

Referring particularly to Figs. 1, 6 of the drawings, my improved safety harness comprises two shoulder straps 10, 12 attached at one end to stationary points 14, 16, disposed at the rear of the back cushion 17 of the passenger seat and passed between the bottom of the back and the seat upholstery are adapted to extend over the passenger's shoulders and thence threaded through guide tubes 18, 20, which are passed through the upholstery of the back cushion. These guide tubes are provided with a common flaring guide member 22, the mouth 24 of which opens at the top of the back cushion. A roller 26 is preferably provided across the mouth 24 whereby the straps are anti-frictionally supported as they pass from the shoulder of the passenger down through guide tubes 18, 20 and finally emerging back of the seat to yieldable take up reels hereinafter to be described.

In addition to the shoulder straps, a lap belt formed in two strap portions 30, 32, is provided to hold the passenger securely at the waist and hips. These strap portions which are united at the front by a suitable buckle 34, pass through suitable tubular guide tubes 28 disposed between the bottom of the back cushion and seat cushion and finally are connected to yieldable take up reels at the back of the seat similar to those referred to for the shoulder straps.

In accordance with this invention each strap section 10, 12, 30, 32 has its individual take up reel. Thus, in normal riding, the passenger has complete freedom of movement in bending from side to side and forwards and backwards. This complete freedom of movement is attained owing to the shoulder straps and the portions of the lap belt being individually yieldable by reason of their connection to individual take up reels, which pay out the strap portions easily to follow the movements of the body and take up the slack as the passenger resumes his normal position.

Now, referring particularly to Figs. 3 to 8 of the drawing, the yieldable take up reels 36 for shoulder straps 10, 12, and similar reels 38 for the strap sections 30, 32, of the lap belt are rotatably mounted on a stationary axle 40 fixed to a sturdy frame work 42, which may be attached to a suitable place on the vehicle, preferably on the floor below the seat. Each reel is formed with a hub portion 44 about which the associated strap portion is wound. For yieldably holding the reel in normally wound up position an annular recess 46 is formed in the flange 48 at one end of the reel to house a coil spring 50. One end of the spring may be attached to the outer hub portion 52 of the reel, while the other end of the spring is attached to a stationary pin 54, held in the end member 56 of the support 42. The other flange 58 of the reel is formed on the periphery thereof with ratchet teeth 60, engageable by a tooth portion 64 of a pawl 62, urged toward engagement with the ratchet by means of a spring 66. A cam 68 fixed on an oscillatory and longitudinally movable stem 70 is normally in position to hold the pawl 62 out of engagement with the ratchet 60, leaving the reel free to pay out the strap 12 in accordance with the movement of the body of the passenger. However, should the vehicle be suddenly decelerated, the cam 68 is rotated into position to permit spring 66 to return pawl 62 into engagement with the ratchet teeth thus preventing the paying out of the strap 12, thereby holding the passenger firmly in position in his seat. It will be noted that although the ratchet is prevented from movement in the direction to pay out strap 12, it is free to turn in the direction to wind up the strap, the tooth 64 clicking over the ratchet teeth as the spring 50 returns the reel to wind the straps thereon as the passenger relaxes his position and leans back toward the back of the seat.

It may be noted at this point that when the cam 68 releases the pawl 62 to engaging position with the ratchet 60, all of the other pawls 72, 74 are also released to engage their corresponding ratchets 76, 78. All of the pawls are mounted on oscillatory master shaft 80 passing through the hub 82 of the pawl. A lost motion connection, consisting preferably of a pin 84 (Figs. 5 and 18), provided for each pawl and passing through the hub thereof and through an enlarged bore 86 in shaft 80, provide lost motion between each pawl and the shaft 80 for the purpose hereinafter described.

I will now describe the improved means whereby the cam 68 is operated to release the pawl so as to engage their corresponding ratchets to lock the reel against rotary motion in the direction to pay out the harness in the event that the vehicle is suddenly decelerated. Referring now particularly to Figs. 3, 9 and to the diagram in Fig. 14, a solenoid 88 is mounted on a stationary support 90 in operative relation to an armature plate 92 fixed to a shaft 70, rotatably mounted in bearings 71. Shaft 70 carries the cam 68 above described. Plate 92 is formed with cam slots 96 located in position to cooperate with anti-friction balls 98 disposed in slots 100 formed in the face of annular plate 102 of the casing for the solenoid 88. Slots 96 are inclined so as to form spiral cam paths for the balls 98. When the solenoid is energized, drawing armature 92 inward and carrying with it shaft 70, the cam slots 96 engaging balls 98 impart a rotary movement to plate 92, and thereby to shaft 70 and cam 68. It will be seen that a slight longitudinal movement of armature 92 will cause an amplified rotary movement of plate 92 and cam 68, sufficiently to release pawl 62 into operative engagement with ratchet 60.

Solenoid 88 is energized upon sudden deceleration of the vehicle as follows:

Referring to the diagram in Fig. 14, an inertia switch 104 is provided in a circuit energized by the usual battery 106 to close the circuit through solenoid 88, this circuit being normally open. When the vehicle is decelerated suddenly a pendulum 108 of the inertia switch 104 is swung to make contact with a conducting cylindrical, tubular member 110 within which the pendulum is mounted. Wire 112 leading from the battery is connected by a branch wire 114 passing through an insulated bushing in the wall of cylinder 110 to make electrical contact with a plate 116 mounted within tube 110 and insulated therefrom. Pendulum 108 is carried by plate 116 by means of a conducting ball member 118 attached to the stem of the pendulum. Ball 118 rests in a socket in plate 116 constituting a universal mounting for the pendulum. A spring 120 engaging the weight portion 108 of the pendulum and seated in a collar 122 attached to the bottom of plate 116 holds the pendulum normally in upright position. When the vehicle is suddenly decelerated in any direction, the inertia of the pendulum overcomes the force of the spring 120 sufficiently to swing the pendulum from its upright position to make contact with the wall of the cylinder 110, thus completing a circuit as follows: from battery 106, through wire 112, wire 114, plate 116, pendulum 118, cylinder 110, wire 123, wire 124 connected to the winding of solenoid 88 and then to ground. When the solenoid is thus energized it moves the stem 70 longitudinally and also angularly to rotate cam 68 as above described. A momentary closing of the circuit is sufficient to energize the solenoid for actuating the cam and after being so actuated the stem and cam remain in this actuated position until they are returned by the actuation of another solenoid 126 disposed at the opposite end of stem 70. Solenoid 126 has cooperating therewith an armature and spirally slotted plate similar to armature 92 hereinabove described. However the disposition of the spiral slot of the plate cooperating with the solenoid 126 is such as to rotate stem 70 in the opposite direction from the rotation caused by solenoid 88. A manually operated switch 128 is provided to close circuit from battery 106 to the winding of solenoid 126 to energize the same whenever it is desired to return the pawls to disengagement from their respective ratchets after being brought into the engagement therewith through the deceleration of the vehicle above described.

Should the passenger or driver desire to hold the harness tight about him for any reason for the purpose of anticipating a deceleration of the vehicle, a manual switch 130 is provided for closing the circuit through solenoid 88 independently of the inertia switch above described.

In operating solenoid 126, for the purpose of restoring the pawls into position out of engagement with their respective ratchets, the lost motion connection between the pin 84 and the shaft 80 above described makes it possible to release pawl 62 by means of an initial rotation of cam 68 prior to the release of the other pawls. The pin 84 swings in bore 86 of the shaft 80 during the initial movement of the cam 68 during which the pawl 62 disengages its ratchet 60. As the cam 68 continues its rotary movement the pin 84 engages the wall of the bore 86 to rotate shaft 80 and thereby swinging the other pawls out of engagement with their corresponding ratchets. In this way the working load on solenoid 126 is materially reduced in overcoming the friction between the pawls and the ratchet teeth during the disengaging operation.

In addition to the operation of solenoid 88 in direct response to deceleration of the vehicle, means is provided whereby a sudden application of the brake will also energize solenoid 88 to cause the pawls to engage their respective ratchets. For this purpose a switch 132 is disposed in operative position adjacent to the brake pedal 134. Should the latter be operated suddenly, so as to move further than normal, a projection 136 connected to the pedal is brought into engagement with switch 132 to close the circuit to soleniod 88.

Fig. 17 illustrates a preferred form of attaching the inner end of the harness or belt strap to the hub 44 of the reel. For this purpose the end of the strap is folded back on itself and tacked on as by stitching at 138 and a longitudinal bar 140 is provided adjacent thereto and screwed to the hub 44 by screws 142 passing through the bar and strap and threaded into the hub.

For the purpose of reducing the friction of the hub 44 of the reel and the stationary shaft 40, a babbitt bushing 144 (Figs. 5, 6, 17) may be provided at the interior of hub 44.

In Fig. 19 a modified form of the reel is shown, wherein the spring 50 is disposed in an annular recess formed in the flange 146 of ratchet 148. The other flange 150 of the reel is made thinner than the corresponding flange in the first form described, illustrated in Fig. 6. In this way the overall length of the casing forming the support for the reels may be substantially reduced.

Should it be desired at times to provide protection for children, carried as passengers in the vehicle, a ring 152 may be provided to slide freely over straps 10, 12. To this ring the usual harness used for a child may be hooked, thus giving the child freedom to stand up or sit down, and to move forward or backwards. Upon the deceleration of the vehicle the straps 10, 12 are locked by the ratchets and will prevent the child from being thrown off the seat.

Figs. 12, 13 illustrate a preferred construction of buckle for the lap belt. This buckle consists of a socket portion 154 and a head portion 156 carrying a pair of spring pressed male locking elements 158. Buttons 160 slidable at the top and bottom of head 156 engage the respective portions 158 for collapsing the same against the tension of spring 162 to disengage male members 158 from the socket 154, for the purpose of opening the buckle. To close the buckle it is merely necessary to press head 156 against socket member 154, causing cam edges 164 of members 158 to force the latter toward one another, thus permitting the entry of portions 158 into the socket to be locked therewith.

Fig. 16 illustrates a modified form of connection for the shoulder straps whereby they may be arranged in parallel or in crossed relation. For this purpose a short strap portion 10a may be extended from the stationary connection 14, through the opening between the back and seat cushions, and provided at its free end with a ring 166. The shoulder strap 10 is provided with snap-hook 168 which may be snapped onto ring 166. A similar short strap portion with a terminal ring may be provided for the other shoulder strap 12 previously decribed. With these modified shoulder strap connections it is possible for the passenger to connect the shoulder straps so as to extend in crossed relation from his shoulders across his chest by merely unhooking the straps from their corresponding short strap connections and hooking them onto the opposite short strap connections. This renders my improved device equally adaptable for use by men as well as by women, who may prefer the parallel shoulder strap arrangement.

While I have described the preferred embodiments of my invention, many variations thereof may occur to persons skilled in the art without departing from the spirit of the invention and the scope thereof as defined in the appended claims.

What I claim and desire to secure by Letters Patent is:

1. A safety device for passengers on vehicles comprising shoulder straps adapted to pass over the shoulders of a passenger, means for fastening one end of a shoulder strap to a relatively stationary point on the vehicle, an automatic take up device to which the other end of the shoulder strap is attached, said take up device comprising a reel, spring means tensioning the reel, a ratchet attached to said reel, a pawl movably mounted adjacent said ratchet, means yieldably urging said pawl into locking engagement with said ratchet to prevent paying out of said shoulder strap, cam means engaging said pawl normally holding it out of engagement with said ratchet, electrically operated means for actuating said cam to release said pawl into locking engagement with said ratchet, said electrically operated means comprising a solenoid, armature means actuated thereby and operatively connected to aid cam, an electric circuit for energizing said solenoid, and an inertia switch disposed in said circuit to maintain the same normally open, and electric contact means adjacent said switch adapted to be closed thereby upon sudden retardation of the vehicle, thereby energizing said solenoid to actuate said cam to release said pawl into locking engagement with said ratchet.

2. A safety device for passengers on vehicles as defined in claim 1, in which stationary cam means is engaged by said armature providing an inclined path engaged by said armature, said path guiding said armature to impart thereto a rotary motion upon slight axial movement of the armature, thereby imparting an amplified rotary movement of said cam means to release said pawl into locking engagement with said ratchet.

3. A safety device for passengers on vehicles as defined in claim 1, including manually operated means for restoring the cam means to pawl disengaging position.

4. A safety device for passengers on vehicles as defined in claim 1, including a second solenoid, armature means for said second solenoid operatively connected to said cam means, and a manually operated switch in said electric circuit to energize said last mentioned armature to restore said cam means to pawl disengaging position.

5. A safety device for passengers on vehicles as defined in claim 1, wherein separate reel means is provided for each shoulder strap, separate pawl and ratchet means for each reel, and cam means for both of said pawls operated by said solenoid to release the pawls to ratchet locking positions when said solenoid is energized.

6. A safety device for passengers on vehicles as defined in claim 5, wherein manually controlled means is provided to restore the cam means to pawl disengaging position after the operation of said solenoid.

7. A safety device for passengers on vehicles as defined in claim 1, wherein a lap belt is provided comprising a strap element guided through an aperture between the seat cushion and the back cushion, and a separate spring actuated reel mounted to rotate coaxially with said shoulder strap reels, a ratchet fast with said last mentioned reel and a pawl, spring-urged into locking engagement therewith, and means movable with said cam means to release said last mentioned pawl into locking engagement with its associated ratchet when said cam means is operated by its actuating solenoid, whereby the passenger is positively held by the waist, as well as by the shoulders in case of sudden stopping of the vehicle.

8. A safety device for passengers on vehicles as defined in claim 7 wherein said lap belt is composed of two straps united by a buckle, and an additional separate spring reel, ratchet and pawl, associated with said cam is provided for the second strap portion of the belt whereby the last mentioned reel is locked simultaneously with said other spring reels by the operation of the solenoid in the event of sudden stopping of the vehicle.

9. A safety device for passengers on vehicles comprising a pair of shoulder straps, one for each shoulder of a passenger, a pair of spring retracted reels mounted at the rear of the vehicle seat about which the rear ends of said shoulder straps are respectively wound, stationary attaching means whereto the other ends of said shoulder straps may be respectively attached, said spring reels normally taking up the straps so as to hold them yieldably about the shoulders of a passenger seated on the seat of the vehicle but independently affording freedom of movement of each shoulder of the passenger, ratchet wheels respectively attached to said reels, spring biased pawls mounted in operative relation with said ratchet wheels, cam means normally engaging said pawls to hold them free of engagement of said ratchet wheels, inertia responsive means, means controlled by said inertia responsive means to actuate said cam means to free said pawls to move into engagement with said ratchet wheels, when said inertia responsive means is actuated by the sudden deceleration of the vehicle, to hold said reels from paying out movement but leaving them free for retracting movement for said straps, and manually operated means for actuating said pawl engaging means for simultaneously freeing said pawls from engagement with said ratchet wheels after said actuation of said inertia responsive means.

10. A safety device for passengers on vehicles as defined in claim 9 wherein the forward ends of said straps are provided with attaching means to said stationary attaching means whereby the shoulder straps may be selectively attached in parallel or crossed relation to adapt the device for male or female passengers.

11. A safety device for passengers on vehicles as defined in claim 9 including a lap belt comprising two portions united by a buckle, a separate spring reel for each portion of the lap belt mounted at the rear of the back of the passenger seat, ratchet wheels respectively attached to said last mentioned reels, and pawls operatively mounted in relation thereto, said pawl engaging means controlled by said responsive means operative also to cause said last mentioned pawls to move into engagement with their respective ratchets upon the deceleration of the vehicle.

12. A safety device for passengers on vehicles as defined in claim 11, including a stationary axle on which all the reels are rotatably mounted, a master shaft on which all of said pawls are mounted for oscillatory movement therewith, lost motion connecting means between said shaft and said pawls, cam means engaging one of said pawls to disengage it from its ratchet, said master shaft being operated by said lost motion connection with said one pawl to operate said other pawls out of engagement with their corresponding ratchets immediately thereafter.

13. A safety device for passengers on vehicles as defined in claim 9, including a stationary axle on which said reels are rotatably mounted, yieldable means normally urging the pawls toward said ratchets, a master shaft disposed adjacent said reels on which said pawls are mounted with lost motion connection therewith for oscillation thereon, cam means operatively disposed adjacent one of said pawls, manually controlled means for operating said cam to disengage said one pawl from its corresponding ratchet, said lost motion connection with said master shaft causing said shaft to thereafter move the other pawl out of engagement with its corresponding ratchet.

14. A safety device for passengers on vehicles as defined in claim 1, including a separate spring reel for each shoulder strap, a stationary axle on which said reels are rotatably mounted, a ratchet wheel for each of said reels, an oscillatory shaft mounted adjacent said reels, a pawl for each of said ratchets, said pawls being mounted on said oscillatory shaft with lost motion connection therewith, the engagement of said cam with said first mentioned pawl operating to hold said shaft in position to hold said other pawl in ratchet releasing position; manually controlled means for operating said first mentioned pawl to swing it out of ratchet engagement after such engagement upon deceleration of the vehicle, said lost motion connection causing the oscillation of said oscillatory shaft to swing the other pawl out of engagement with its ratchet after the first pawl has disengaged its ratchet.

15. A safety device for passengers on vehicles comprising a pair of shoulder straps, one for each shoulder of a passenger, a pair of spring retracted reels mounted at the rear of the vehicle seat about which the rear ends of said shoulder straps are respectively wound, stationary attaching means whereto the other ends of said shoulder straps may be respectively attached, said spring reels normally taking up the straps so as to hold them yieldably about the shoulders of a passenger seated on the seat of the vehicle but independently affording freedom of movement of each shoulder of the passenger, ratchet wheels respectively attached to said reels, pawls mounted in operative relation with said ratchet wheels, means normally engaging said pawls to hold them free of engagement of said ratchet wheels, an electric switch adjacent the brake pedal of the vehicle disposed in position to be closed in the event of a sudden forceful application of the brake, a solenoid in an electric circuit with said switch, and means actuated by said solenoid upon the closure of said switch as aforesaid to operate said pawl engaging means so as to free said pawls from said engagement, and means operating to quickly move said pawls into locking engagement with their respective ratchets when the pawls are so freed.

References Cited in the file of this patent
UNITED STATES PATENTS

| | | |
|---|---|---|
| 2,365,626 | Carlisle | Dec. 19, 1944 |
| 2,488,858 | Franz | Nov. 22, 1949 |
| 2,596,427 | Nordmark | May 13, 1952 |
| 2,634,802 | Stumm | Apr. 14, 1953 |
| 2,705,529 | Bull et al. | Apr. 5, 1955 |
| 2,708,555 | Heinemann et al. | May 17, 1955 |
| 2,708,966 | Davis | May 24, 1955 |
| 2,771,128 | Doolittle | Nov. 20, 1956 |

OTHER REFERENCES

Ford Field (periodical), September 1954, vol. 56, No. 9, pages 16 and 34, article by Howe on "Safety Belts."